US009632175B2

(12) United States Patent
Nakamichi et al.

(10) Patent No.: US 9,632,175 B2
(45) Date of Patent: Apr. 25, 2017

(54) TARGET OBJECT DETECTION DEVICE AND METHOD OF DISPLAYING ECHO DATA IN THE TARGET OBJECT DETECTION DEVICE

(71) Applicant: Furuno Electric Co., Ltd., Nishinomiya (JP)

(72) Inventors: Jun Nakamichi, Nishinomiya (JP); Yu Goto, Nishinomiya (JP); Masaaki Matsubara, Nishinomiya (JP); Norihiro Nishimoto, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 306 days.

(21) Appl. No.: 13/973,892

(22) Filed: Aug. 22, 2013

(65) Prior Publication Data
US 2014/0064025 A1 Mar. 6, 2014

(30) Foreign Application Priority Data
Aug. 30, 2012 (JP) .................................. 2012-190068

(51) Int. Cl.
*G01S 7/56* (2006.01)
*G01S 15/96* (2006.01)
(Continued)

(52) U.S. Cl.
CPC ................ *G01S 7/56* (2013.01); *G01S 7/533* (2013.01); *G01S 7/58* (2013.01); *G01S 7/60* (2013.01); *G01S 7/6209* (2013.01); *G01S 15/96* (2013.01)

(58) Field of Classification Search
CPC ...................................... G01S 7/56; G01S 7/96
(Continued)

(56) References Cited

U.S. PATENT DOCUMENTS 5,184,330 A * 2/1993 Adams ..................... G01S 7/526
367/111
2007/0147173 A1 * 6/2007 Park ......................... G01S 7/521
367/107
(Continued)

FOREIGN PATENT DOCUMENTS

JP H04265881 A 9/1992
JP H0573011 A 3/1993
(Continued)

*Primary Examiner* — James Hulka
*Assistant Examiner* — John T Nolan
(74) *Attorney, Agent, or Firm* — Alleman Hall McCoy Russell & Tuttle LLP

(57) ABSTRACT

A target object detection device is provided. The device includes a signal processor, a display unit, and a controller. The signal processor receives a reception signal generated based on an echo of an ultrasonic wave from a target object and generates echo data corresponding to a distance from a transmission source of the ultrasonic wave to the target object every time the ultrasonic wave is transmitted. The display unit has a display screen with a first side and a second side that is turnable in an axial direction perpendicular to the display screen, and displays an image on the display screen based on the echo data. The controller sets a range with respect to time at which the ultrasonic wave is transmitted, and outputs the echo data corresponding to the ultrasonic wave within the time range according to turning of the display screen.

13 Claims, 13 Drawing Sheets

(51) Int. Cl.
*G01S 7/533* (2006.01)
*G01S 7/58* (2006.01)
*G01S 7/60* (2006.01)
*G01S 7/62* (2006.01)

(58) Field of Classification Search
USPC .................................................. 367/111, 107
See application file for complete search history.

(56) References Cited

U.S. PATENT DOCUMENTS

| | | | |
|---|---|---|---|
| 2010/0295803 A1* | 11/2010 | Kim | G06F 9/4445 345/173 |
| 2010/0309753 A1* | 12/2010 | Misonoo | G01S 7/6218 367/107 |
| 2014/0010043 A1* | 1/2014 | Pawlik | G01S 15/96 367/7 |
| 2014/0022864 A1* | 1/2014 | Lebedev | G01S 7/003 367/107 |
| 2014/0057677 A1* | 2/2014 | Liubinas | G01S 15/96 455/556.1 |

FOREIGN PATENT DOCUMENTS

| | | |
|---|---|---|
| JP | H05113480 A | 5/1993 |
| JP | H11223063 A | 8/1999 |
| JP | 200133541 A | 2/2001 |
| JP | 200134253 A | 2/2001 |
| JP | 2003344530 A | 12/2003 |
| JP | 2008131616 A | 6/2008 |
| JP | 201026343 A | 2/2010 |
| JP | 2010281736 A | 12/2010 |
| JP | 2011237180 A | 11/2011 |

* cited by examiner

TARGET OBJECT DETECTION DEVICE AND METHOD OF DISPLAYING ECHO DATA IN THE TARGET OBJECT DETECTION DEVICE

CROSS-REFERENCE TO RELATED APPLICATION(S)

The application claims priority under 35 U.S.C. §119 to Japanese Patent Application No. 2012-190068, which was filed on Aug. 30, 2012, the entire disclosure of which is hereby incorporated by reference.

TECHNICAL FIELD

The present invention relates to a target object detection device for detecting an echo from a target object by transceiving ultrasonic waves, and a method of displaying the echo in the target object detection device.

BACKGROUND OF THE INVENTION

As a target object detection device, there have been fish finders known for detecting a school of fish underwater by transceiving ultrasonic waves and radar apparatuses for detecting a target object by transceiving radio waves. For example, a fish finder transmits ultrasonic waves in a depth direction underwater and receives an echo signal from a target object (e.g., a school of fish), and detects the target object. The transception is performed at predetermined time intervals, and the detection result obtained from each transception is sequentially depicted on a display screen while shifting the display position.

With the target object detection device, various displaying methods are proposed to improve visibility in displaying the detected target object. For example, JP2010-281736A discloses a fish finder (target object detection device) is proposed, which displays a plurality of display screens including a single display screen and an enlarged display screen, as well as an area where a region to be enlarged is specified on the single display screen. An operator can easily specify a desired enlarged region by instructing a change of the position and/or the size of the area.

However, with the conventional fish finders (target object detection device) described above, the display direction of the display screen for displaying the single screen and the like is fixed. Generally, within a display area where the single display screen is displayed, the resolution in a vertical direction (depth direction) is set relatively high, whereas the resolution in a horizontal direction (time direction) is set relatively low. Therefore, the display range of echo data with respect to time is fixed and cannot be switched flexibly.

SUMMARY OF THE INVENTION

The present invention is made in view of the above situation, and aims to provide a target object detection device that can flexibly switch a time display range of echo data and a method of displaying the echo data in the target object detection device.

According to an aspect of the invention, a target object detecting device is provided. The device includes a signal processor, a display unit, and a controller. The signal processor receives a reception signal generated based on an echo of an ultrasonic wave from a target object and generates echo data corresponding to a distance from a transmission source of the ultrasonic wave to the target object every time the ultrasonic wave is transmitted. The display unit has a display screen with a first side and a second side that is turnable in an axial direction perpendicular to the display screen, and displays an image on the display screen based on the echo data. The controller sets a range with respect to time at which the ultrasonic wave is transmitted, and outputs the echo data corresponding to the ultrasonic wave within the time range according to turning of the display screen.

According to the above target object detection device, the time range of displaying the echo data to the display unit can be changed according to the turning of the display screen. In other words, the time range of displaying the echo data can be switched according to the screen state of the display screen. As a result, the time range of displaying the echo data can be switched flexibly.

The controller may set a range with respect to the distance to which the echo data displayed on the display unit corresponds, according to the turning of the display screen.

In this case, a spatial range of displaying the echo data on the display unit can be changed according to the turning of the display screen. In other words, the spatial range of displaying the echo data can be switched. As a result, not only the time range of displaying the echo data but also the spatial range can be switched flexibly.

According to the turning of the display screen, the signal processor may switch a side with which first echo data and second echo data associate the distance between a first side having a higher resolution than a second side and a second side, respectively.

According to the above target object detection device, the first echo data and the second echo data are switched to be displayed according to the turning of the display unit. While a depth direction is associated with the first side where a resolution of the display screen is higher, a time direction can be associated with the second side where the resolution of the display screen is lower. As a result, the depth direction of the echo data can be displayed in detail while the time direction of the echo data can be displayed in a wide area.

The display screen may have a long side as the first side and a short side as the second side.

In this case, while the depth direction is associated with the long side of the display screen, the time direction can be associated with the long side of the display screen. As a result, the depth direction of the echo data can be displayed in detail while the time direction of the echo data can be displayed in a wide area.

The controller may detect a first screen state where the long side of the display screen is arranged in the vertical direction, and a second screen state where the short side of the display screen is arranged in the vertical direction. The signal processor may generate the first echo data when the first screen state is detected, and the second echo data when the second screen state is detected.

In this case, the first and second echo data shown on the display screen are switched therebetween according to whether the long side of the display screen is arranged along the vertical direction or the short side is arranged along the vertical direction. The depth direction of the echo data can surely be displayed in detail according to the screen state of the display screen, and the time direction of the echo data can be displayed in a wide area.

The signal processor may include a first echo data generating module for generating the first echo data by thinning out a predetermined amount of signal components from the reception signal, and a second echo data generating module for generating the second echo data by thinning out a larger amount of the signal components from the reception signal than the first echo data generating module.

In this case, in the generating modules provided individually to the signal processor, a predetermined amount of the signal components is thinned out to generate the first and second echo data. Therefore, the first and second echo data can surely be generated.

The target object detection device may further include a first memory for saving the first echo data and a second memory for saving the second echo data. The display unit may display either one of the first echo data saved in the first memory and the second echo data saved in the second memory.

In this case, the first and second echo data generated from the reception signal is stored in the first and second memory. Thus, the first and second echo data can be displayed appropriately according to the screen state of the display screen without causing a situation of improper display and the like.

According to the turning of the display screen, the signal processor may switch a side with which first echo data and second echo data associate with the distance between the first side having a higher resolution than the second side and the second side, respectively. The signal processor may include an extender for extending the second echo data in the second memory and outputting the extended second echo data to the first memory when the first screen state is detected, and a compressor for compressing the first echo data in the first memory and outputting the compressed first echo data to the second memory when the second screen state is detected.

In this case, the second echo data in the second memory is extended by the extender and outputted to the first memory. The extended second echo data is displayed on the display screen in the first screen state. For example, when the screen state of the display screen is switched from the second screen state to the first screen state, the position of the school of fish and the like can be displayed with the extended second echo data without waiting for the first echo data to be displayed.

On the other hand, the first echo data in the first memory is compressed by the compressor and outputted to the second memory. The compressed first echo data is displayed on the display screen in the second screen state. For example, when the screen state of the display screen is switched from the first screen state to the second screen state, the position of the school of fish and the like can be displayed with the compressed first echo data without waiting for the second echo data to be displayed.

When the first echo data and the extended second echo data are saved in the first memory, the display unit may display combined echo data obtained by combining the first and extended second echo data.

In this case, the first echo data and the echo data stored as the second echo data are combined and displayed on the display screen. Thus, the echo data with large information amount which includes the echo data saved as the second echo data, and the first echo data can be displayed on the display screen in the first screen state.

When the second echo data and the compressed first echo data are saved in the second memory, the display unit may display combined echo data obtained by combining the second and compressed first echo data.

In this case, the second echo data and the echo data stored as the first echo data are combined and displayed on the display screen. Thus, the echo data with a large information amount which includes the echo data saved as the first echo data, and the second echo data can be displayed on the display screen in the second screen state.

The target object detection device may further include a communicator for communicating with a wireless communication terminal having a display screen for displaying the echo data. When the controller is informed with a screen state of the display screen of the wireless communication terminal, the controller may transmit either one of the first and second echo data to the wireless communication terminal via the communicator.

In this case, the echo data corresponding to the state of the display screen of the wireless communication terminal is transmitted to the wireless communication terminal. Thus, with the wireless communication terminal that can communicate with the fish finder wirelessly can display the echo data equivalent to the display unit of the fish finder.

The target object detection device may further include a transceiver for transmitting the ultrasonic wave and receiving the echo.

According to another aspect of the invention, a fish finder is provided. The target object detecting device of any of the aspects described above is applied to the fish finder. The effects obtained from the above described target object detecting device can also be obtained from the fish finder.

A method of displaying echo data in the target object detecting device of the present invention including a display unit turnably provided in a state where the display screen having the first and second sides faces the operator is provided. The method includes outputting a reception signal corresponding to an intensity of an echo with respect to a transmission signal, generating echo data corresponding to a depth of the reception signal, detecting a screen state of the display screen with respect to the turning of the display unit, and changing a range of the echo data with respect to time displayed on the display unit according to the detection result of the screen state.

According to the method of displaying the echo data by the target object detecting device, the time range of the echo data displayed on the display unit can be changed according to the turning of the display screen. In other words, the time range of displaying the echo data can be switched according to the screen state of the display screen.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Hereinafter, one embodiment of the present invention is described in detail with reference to the accompanying drawings.

Here, a case where a target object detection device of the present invention is applied to a fish finder is described; however, an object to which the target object detection device is applied is not limited to the fish finder, and can be applied to a radar apparatus for capturing a target object (e.g., a ship or a buoy on the sea, or a bird) by discharging a radio wave and capturing a reflection wave from the target object.

(First Embodiment)

Figure 1:
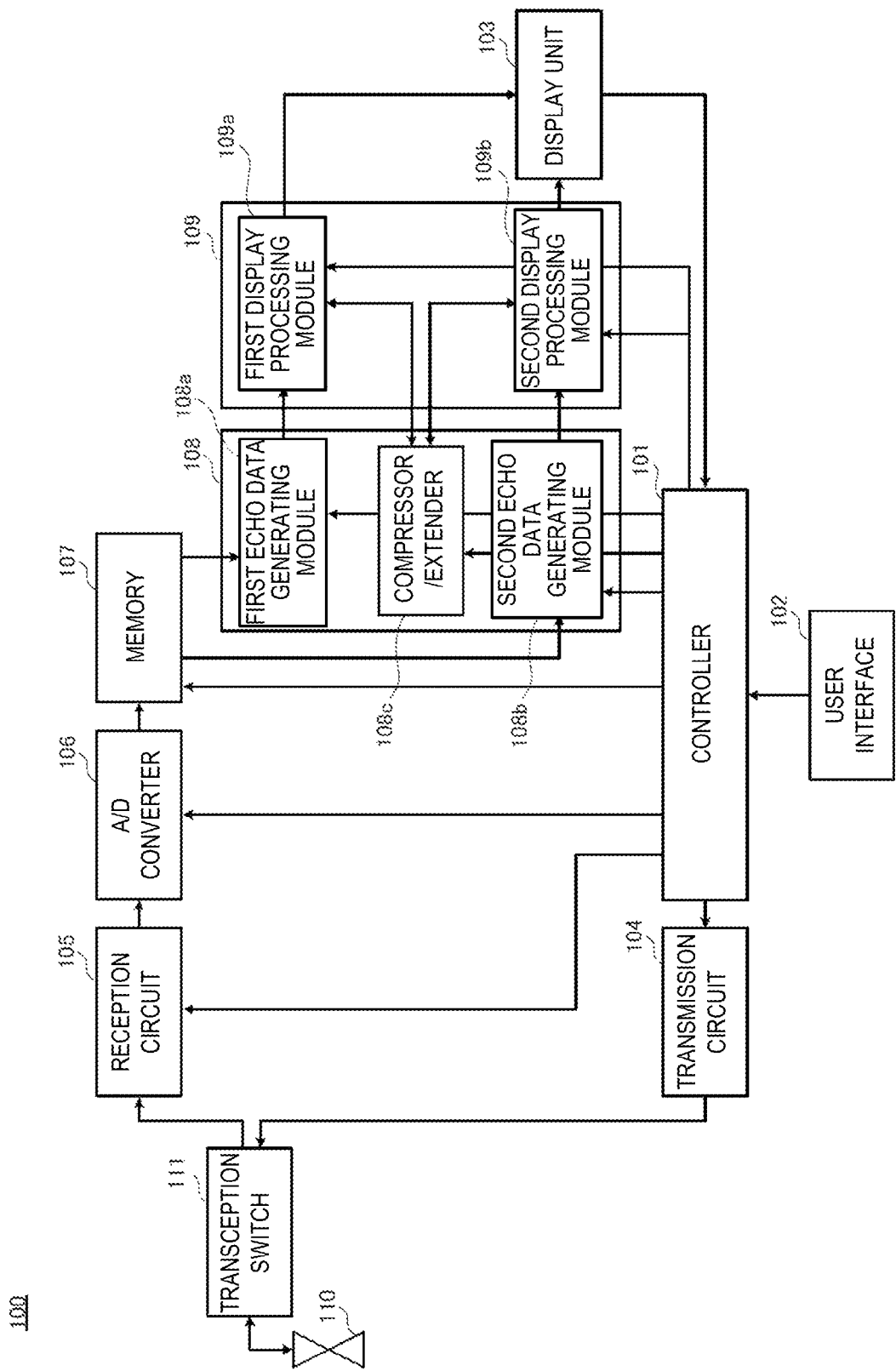
FIG. 1 is a block diagram showing a configuration of a fish finder as a target object detection device according to a first embodiment of the present invention.

FIG. 1 is a block diagram showing a configuration of a fish finder 100 according to a first embodiment of the present invention. As shown in FIG. 1, the fish finder 100 includes a controller 101 for entirely controlling the fish finder 100. The controller 101 is connected with a user interface 102 and a display unit 103. Moreover, the controller 101 connects with a transmission circuit 104, a reception circuit 105, an A/D converter 106, a memory 107, a signal processor 108, and a display processor 109.

The user interface 102 receives an operation on the fish finder 100 from an operator. For example, the user interface 102 is configured with arrow keys for moving a cursor in vertical and horizontal directions, a select button for instructing to select, a function key assigned with a predetermined function, etc. The operator can instruct the controller 101 to, for example, set a detection range of the fish finder 100.

The display unit 103 is turnably provided to a housing of the fish finder 100 in a state where its display screen faces the operator (i.e., turnable in an axial direction perpendicular to the display screen). The display unit 103 displays reception data (echo data) for display, while the vertical axis of the display screen is set to indicate a depth direction and the horizontal axis of the display screen is set to indicate a time direction. Here, the configuration of the display unit 103 provided to the fish finder 100 is described with reference to FIG. 2, which is a schematic view of the display unit 103 provided to the fish finder 100 of this embodiment.

As shown in FIG. 2, the display unit 103 has a rectangular display screen 103a. On the display screen 103a, multiple images of echo data (of a school of fish, etc.) and noises are displayed. The echo data is displayed on the display screen 103a darker in color as the reflection intensity is higher, while being updated with the time lapse by one line at a time in the vertical direction on the display screen 103a.

Figure 2A:
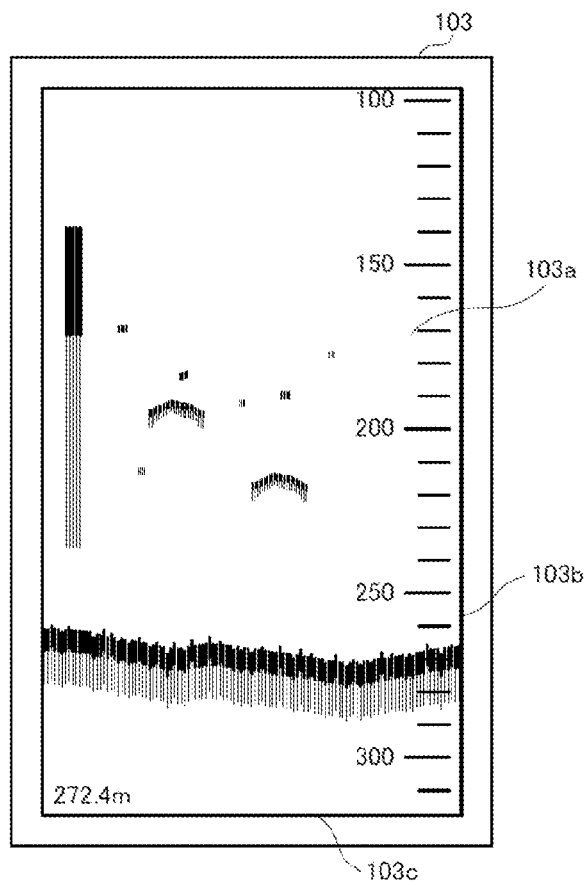
FIGS. 2A and 2B are schematic views of a display unit provided to the fish finder of the first embodiment.
Figure 2B:
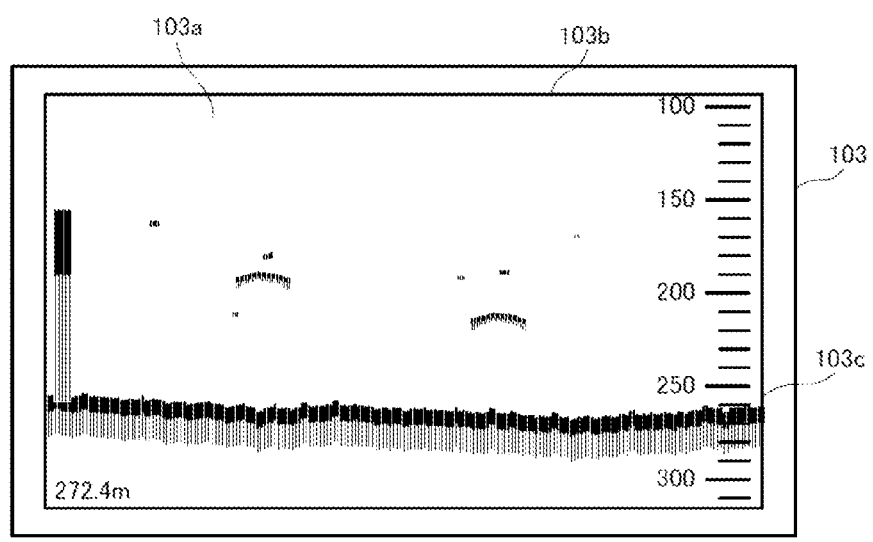

The display screen 103a has a first side as a long side 103b where the resolution is set relatively high, and a second side as a short side 103c where the resolution is set relatively low. FIG. 2A shows a state where the long side 103b of the display screen 103a is arranged in up-and-down directions of the fish finder 100 (hereinafter, "the vertically-long screen state"). FIG. 2B shows a state where the short side 103c of the display screen 103a is arranged in the up-and-down directions of the fish finder 100 (hereinafter, "the horizontally-long screen state"). Here, the up-and-down directions of the fish finder 100 is not limited to correspond to the vertical direction, and the concept thereof includes a direction extending at over a predetermined angle with respect to the horizontal direction.

The display unit 103 is configured such that the display screen 103a is turnable between the vertically-long screen state shown in FIG. 2A and the horizontally-long screen state shown in FIG. 2B. Specifically, the display unit 103 can turn the display screen 103a by 90° while facing the operator. As it is described later in detail, the controller 101 detects the state of the display screen 103a (the vertically-long screen state or the horizontally-long screen state) due to the turning of the display unit 103, and controls the generation of the echo data corresponding to the detected screen state. The vertically-long screen state corresponds to a first screen state in which the depth direction of the echo data can be displayed in detail. On the other hand, the horizontally-long screen state corresponds to a second screen state in which the time direction of the echo data can be displayed in a wide area.

Back to FIG. 1, the configuration of the fish finder 100 is continuously described. Under the control of the controller 101, the transmission circuit 104 inputs a pulse-shaped signal to a transducer 110. Here, the pulse-shaped signal from the transmission circuit 104 is inputted to the transducer 110 via a transception switch 111 internally built with a trap circuit. The transducer 110 is configured with, for example, an oscillator attached to a ship bottom, and the oscillator transmits an ultrasonic signal underwater and receives an echo signal. The transducer 110 outputs the ultrasonic wave (transmission signal) underwater according to the pulse-shaped signal inputted from the transmission circuit 104. The transducer 110 configures the transceiver in the claims.

The ultrasonic wave outputted from the transducer 110 propagates underwater and reflects on a target object, such as a school of fish or sea bottom on a propagation path. The ultrasonic wave reflected on the target object is received by the transducer 110 as an echo. The transducer 110 outputs the reception signal corresponding to the intensity of the received echo, to the reception circuit 105. Here, the reception signal from the transducer 110 is inputted to the reception circuit 105 via the transception switch 111. Under the control of the controller 101, the reception circuit 105 amplifies the inputted reception signal and outputs it to the A/D converter 106.

Figure 3:
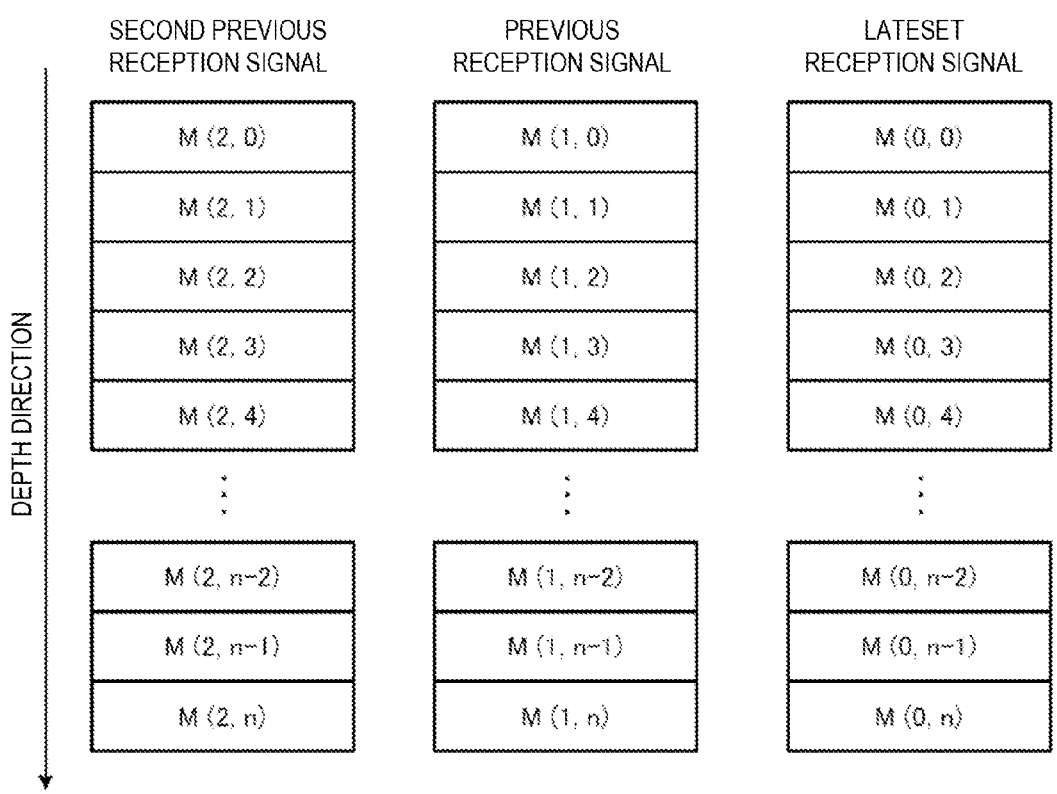
FIG. 3 is a schematic view of a reception signal stored in a memory provided to the fish finder of the first embodiment.

Under the control of the controller 101, the A/D converter 106 converts the reception signal into a digital signal by using a predetermined sampling rate. The converted digital signal is stored sequentially in the memory 107. Here, with reference to FIG. 3, one example of the reception signal stored in the memory 107 is described. FIG. 3 is a schematic view of the reception signal stored in the memory 107 provided to the fish finder 100 of the first embodiment.

The memory 107 sequentially stores the reception signal obtained in one measurement in the depth direction at a predetermined resolution. For example, the reception signal is sequentially stored in the memory 107 at every predetermined period of time from a transmission of the ultrasonic wave. The memory 107 stores data columns corresponding to a plurality of measurements. For example, as shown in FIG. 3, the memory 107 stores a latest reception signal, in which data with a smallest time difference from the signal transmission to the signal reception (at a shallowest depth) is stored as M(0, 0). Additionally, other data of the reception signal is stored as M(0, 1) to M(0, n) sequentially according to the resolution in the depth direction.

Similarly, in a measurement of one measurement before the latest measurement (hereinafter, may be referred to as "the previous measurement"), data at the shallowest depth is stored as M(1, 0) and sequentially as M(1, 1) to M(1, n) according to the resolution in the depth direction. In a measurement of two measurements before the latest measurement (hereinafter, may be referred to as "the second previous measurement"), data at the shallowest depth is stored as M(2, 0) and sequentially as M(2, 1) to M(2, n) according to the resolution in the depth direction. In the example shown in FIG. 3, the case where data columns from three measurements including the latest data column is shown; however, the number of stored data columns may suitably be changed based on the volume of the memory 107. When over a predetermined number of data columns are stored, the oldest data column is erased and is updated by the latest data column.

Under the control of the controller 101, the signal processor 108 generates the echo data to be displayed on the display screen 103a of the display unit 103. The signal processor 108 includes a first echo data generating module 108a, a second echo data generating module 108b, and a compressor/extender 108c. The echo data generated by the signal processor 108 is outputted to the display processor 109. The display processor 109 includes a first display processing module 109a and a second display processing module 109b.

The first echo data generating module 108a converts the reception signal stored in the memory 107 into the echo data to be displayed on the display screen 103a. Specifically, the first echo data generating module 108a generates echo data for displaying details (hereinafter, referred to as "the detailed echo data") to be displayed on the display screen 103a in the vertically-long screen state. The detailed echo data configures the first echo data in the claims. The detailed echo data is echo data along the long side 103b of the display screen 103a in association with depth.

Here, one example of a method of generating the detailed echo data by the first echo data generating module 108a is described with reference to FIG. 4, which is a schematic view of the example of the generating method of the details-displaying echo data by the fish finder 100 of the first embodiment. Note that, in the reception signal shown in FIG. 4, boxes of signal components having high echo intensities are hatched.

When generating the detailed echo data, the first echo data generating module 108a reads the respective reception signals from the memory 107. The first echo data generating module 108a thins out a predetermined amount of signal components from each reception signal based on the number of pixels (screen resolution) of the long side 103b of the display screen 103a in the vertically-long screen state. The data which is thinned out by the predetermined amount of signal components as above becomes the detailed echo data for one measurement (one ping).

Figure 4:
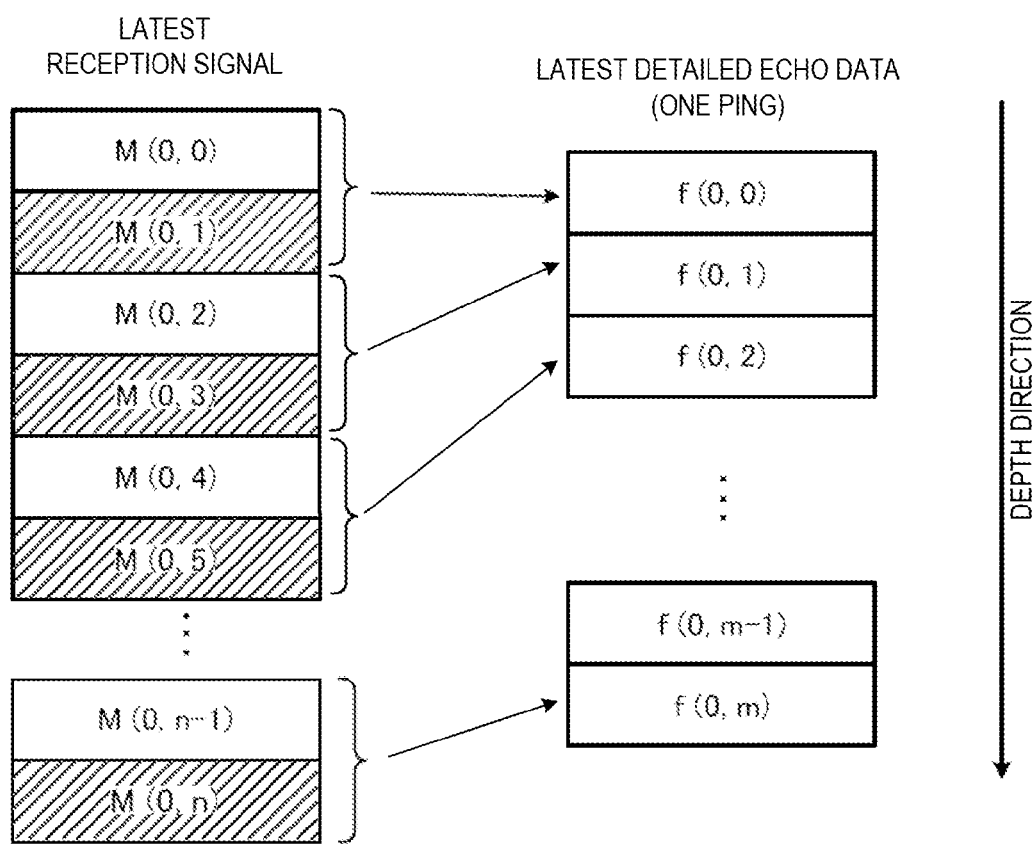
FIG. 4 is a schematic view of an example of a generating method of details-displaying echo data by the fish finder of the first embodiment.

For example, as shown in FIG. 4, among the latest-measured reception signal components M(0, 0) to M(0, n), the first echo data generating module 108a sets the signal component with higher echo intensity between the signal components M(0, 0) and M(0, 1) to be echo data f(0, 0) of a pixel corresponding to the shallowest position. In this example, the M(0, 1) has a higher echo intensity. Moreover, the first echo data generating module 108a sets the signal component with higher echo intensity between the signal components M(0, 2) and M(0, 3) to be echo data f(0, 1) of a pixel corresponding to the second shallowest position. In this example, the M(0, 3) has a higher echo intensity. Additionally, the first echo data generating module 108a sets the signal component with higher echo intensity between the signal components M(0, 4) and M(0, 5) to be echo data f(0, 2) of a pixel corresponding to the third shallowest position. In this example, the M(0, 5) has a higher echo intensity.

As described above, the first echo data generating module 108a generates echo data f(0, 0) to f(0, m) for the respective pixels by thinning out in a manner where the signal components with the higher echo intensities remain. The generated echo data serves as the detailed echo data for the latest one ping. The detailed echo data generation by the first echo data generating module 108a is not limited to the example shown in FIG. 4, and may suitably be changed.

The first echo data generating module 108a outputs the detailed echo data generated as above, to the first display processing module 109a to update the contents in an image memory of the first display processing module 109a. The image memory configures the first memory in the claims, and saves the detailed echo data.

Here, one example of the detailed echo data stored in the first display processing module 109a is described with reference to FIG. 5, which is a schematic view of the detailed echo data stored in the first display processing module 109a of the fish finder 100 of the first embodiment. Hereinafter, the image memory of the first display processing module 109a is referred to as "the detailed-display memory."

Figure 5:
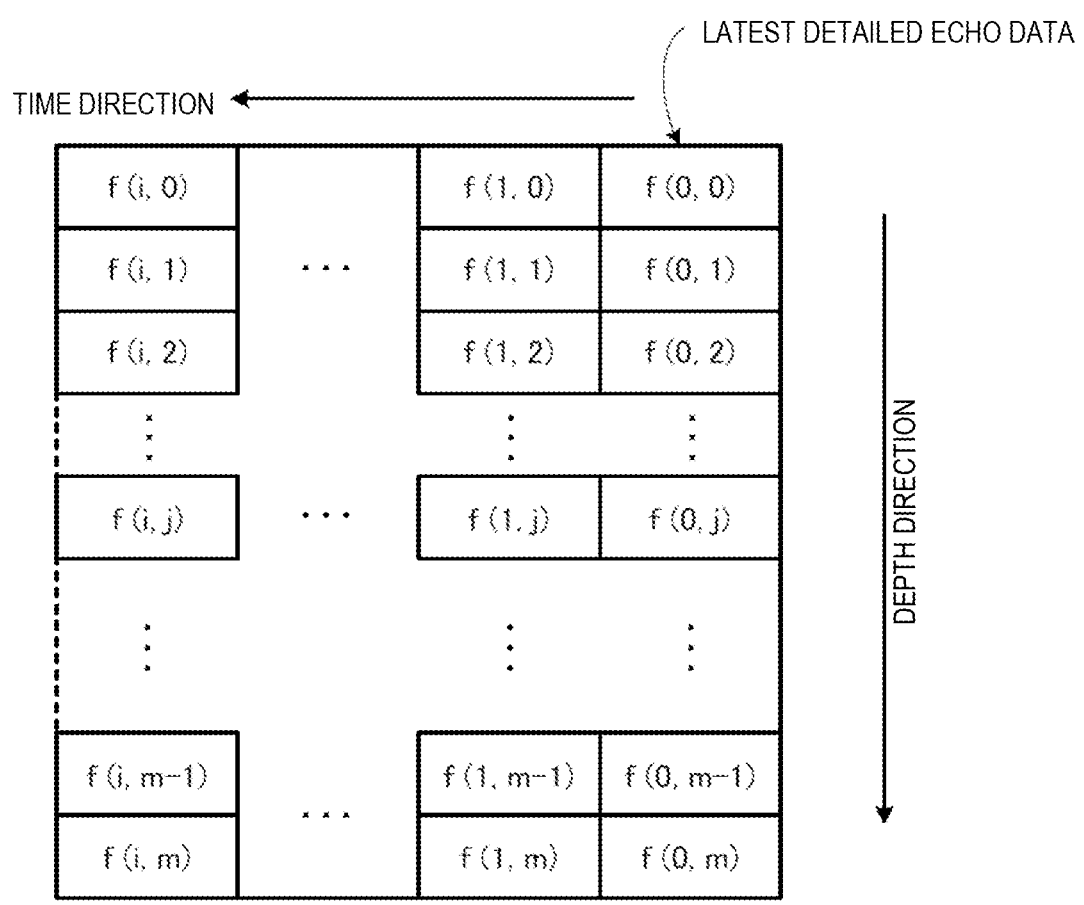
FIG. 5 is a schematic view of the details-displaying echo data by the fish finder of the first embodiment.

As shown in FIG. 5, the detailed-display memory can store the detailed echo data for all the pixels on the display screen 103a in the vertically-long screen state. Specifically, as echo data corresponding to a right-end side section of the display screen 103a in the vertically-long screen state, the latest detailed echo data f(0, 0) to f(0, m) is stored. Similarly, detailed echo data f(1, 0) to f(1, m) from the previous measurement is stored. Accordingly, detailed echo data f(i, 0) to f(i, m) based on a maximum number of pixels of the short side 103c side of the display screen 103a in the vertically-long screen state is stored.

When the fish finder 100 is activated, the detailed-display memory stores no detailed echo data. In this case, for example, a background color of the display screen 103a is displayed on the display screen 103a. As time lapses, the detailed echo data is sequentially updated. When the detailed echo data is updated by over the maximum number of pixels of the short side 103c side of the display screen 103a in the vertically-long screen state, the oldest detailed echo data is erased.

Meanwhile, the second echo data generating module 108b converts the reception signal stored in the memory 107 into the echo data to be displayed on the display screen 103a. Specifically, the second echo data generating module 108b generates echo data for a wide area to be displayed on the display screen 103a in the horizontally-long screen state (hereinafter, referred to as "the wide-area echo data"). The wide-area echo data configures the second echo data in the claims. The wide-area echo data is echo data along the short side 103c of the display screen 103a in association with depth. Here, one example of a method of generating the wide-area echo data by the second echo data generating module 108b is described with reference to FIG. 6, which is a schematic view of the example of the generating method of the wide-area echo data by the fish finder 100 of the first embodiment. Note that, in the reception signal shown in FIG. 6, boxes of signal components having high echo intensities are hatched similarly to FIG. 4.

When generating the wide-area echo data, the second echo data generating module 108b reads the respective reception signals from the memory 107. The second echo data generating module 108b thins out a predetermined amount of signal components from each reception signal based on the number of pixels (screen resolution) of the short side 103c of the display screen 103a in the horizontally-long screen state. The number of signal components to be thinned out according to the generation of the wide-area echo data is larger than the number of signal components to be thinned out according to the generation of the detailed echo data. The data which is thinned out by the predetermined amount of signal components as above becomes the wide-area echo data for one measurement (one ping).

Figure 6:
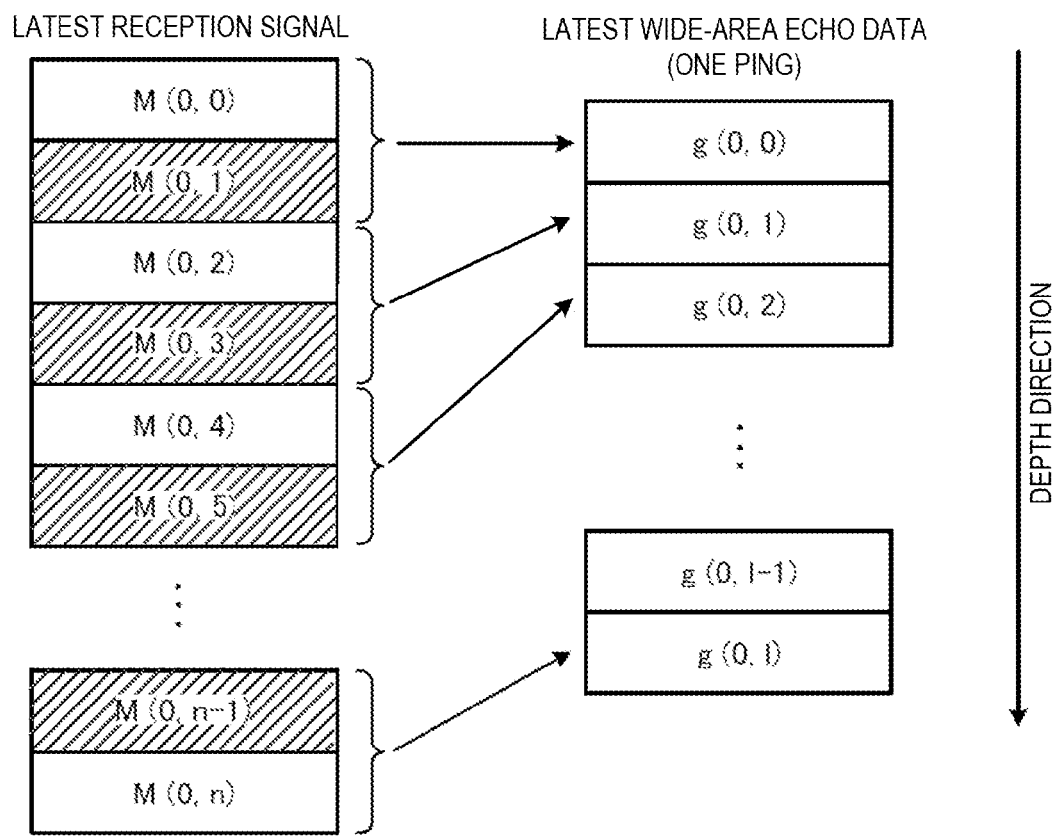
FIG. 6 is a schematic view of an example of a generating method of wide-area-displaying echo data by the fish finder of the first embodiment.

For example, as shown in FIG. 6, among the latest-measured reception signal components M(0, 0) to M(0, n), the second echo data generating module 108b sets the signal component with higher echo intensity between the signal components M(0, 0) and M(0, 1) to be echo data g(0, 0) of a pixel corresponding to the shallowest position. In this example, the M(0, 1) has a higher echo intensity. Moreover, the second echo data generating module 108b sets the signal component with higher echo intensity between the signal components M(0, 2) and M(0, 3) to be echo data g(0, 1) of a pixel corresponding to the second shallowest position. In this example, the M(0, 3) has a higher echo intensity. Additionally, the second echo data generating module 108b sets the signal component with higher echo intensity between the signal components M(0, 4) and M(0, 5) to be echo data g(0, 2) of a pixel corresponding to the third shallowest position. In this example, the M(0, 5) has a higher echo intensity. As described above, the second echo data generating module 108b generates echo data g(0, 0) to g(0, 1) for the respective pixels by thinning out in a manner where the signal components with the higher echo intensities remain. The generated echo data serves as the wide-area echo data for the latest one ping. The wide-area echo data generation by the second echo data generating module 108b is not limited to the example shown in FIG. 6, and may suitably be changed.

The second echo data generating module 108b outputs the generated wide-area echo data to the second display processing module 109b to update the contents in an image memory of the second display processing module 109b. The image memory configures the second memory in the claims, and saves the wide-area echo data.

Here, one example of the wide-area echo data stored in the second display processing module 109b is described with reference to FIG. 7, which is a schematic view of the wide-area echo data stored in the second display processing module 109b of the fish finder 100 of the first embodiment. Hereinafter, the image memory of the second display processing module 109b is referred to as "the wide-area-display memory."

Figure 7:
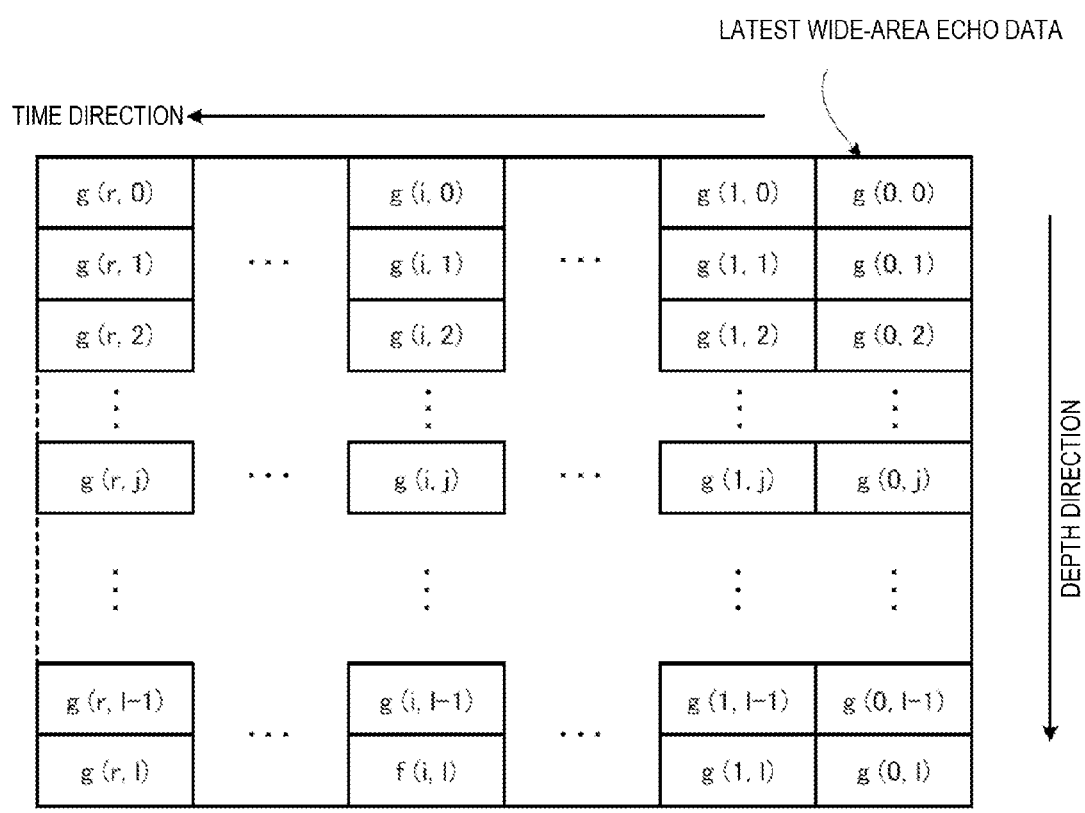
FIG. 7 is a schematic view of the wide-area-displaying echo data by the fish finder of the first embodiment.

As shown in FIG. 7, the wide-area-display memory can store the wide-area echo data for all the pixels on the display screen 103a in the horizontally-long screen state. Specifically, as echo data corresponding to a right-end side section of the display screen 103a in the horizontally-long screen state, the latest wide-area echo data g(0, 0) to g(0, 1) is stored. Similarly, wide-area echo data g(1, 0) to g(1, 1) from the previous measurement is stored. Accordingly, wide-area echo data g(r, 0) to g(r, 1) based on a maximum number of pixels of the long side 103b side of the display screen 103a in the horizontally-long screen state is stored.

When the fish finder 100 is activated, the wide-area-display memory stores no wide-area echo data. In this case, for example, a background color of the display screen 103a is displayed on the display screen 103a. As time lapses, the wide-area echo data is sequentially updated. When the wide-area echo data is updated by over the maximum number of pixels of the long side 103b side of the display screen 103a in the horizontally-long screen state, the oldest wide-area echo data is erased.

With the fish finder 100 of this embodiment, the detailed echo data and the wide-area echo data are generated by the echo data generating modules (the first echo data generating module 108a and the second echo data generating module 108b) provided individually to the signal processor 108, by thinning out the respective predetermined amounts of signal components as described above. In this manner, the detailed echo data and the wide-area echo data can surely be generated from the reception signal.

The compressor/extender 108c configures the compressor in the claims, and compresses the detailed echo data in the depth direction, which is saved in the detailed-display memory of the first display processing module 109a. In this case, the compressor/extender 108c compresses the detailed echo data to coincide with the signal components corresponding to the wide-area echo data in the depth direction. Moreover, the compressor/extender 108c outputs the compressed detailed echo data (hereinafter, suitably referred to as "the compressed echo data") to the wide-area-display memory of the second display processing module 109b.

Figure 8:
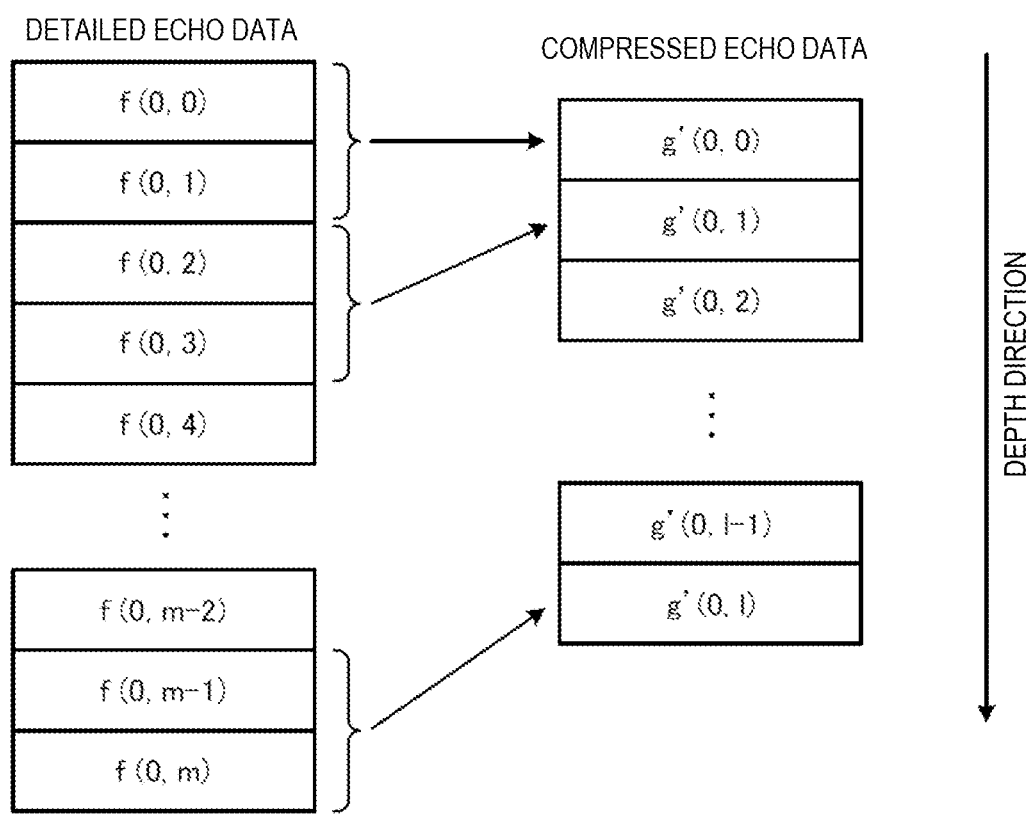
FIG. 8 is a schematic view of an example of a compressing method of the details-displaying echo data by the fish finder of the first embodiment.

Here, one example of a method of compressing the detailed echo data saved in the detailed-display memory is described with reference to FIG. 8, which is a schematic view of the example of the compressing method of the detailed echo data by the fish finder 100 of the first embodiment. In FIG. 8, for the sake of convenience, the description is given using the detailed echo data for one ping as an example. When the detailed echo data for two or more pings is saved, the following compressing method is repeated.

As shown in FIG. 8, when compressing the detailed echo data, the compressor/extender 108c reads the detailed echo data f(0, 0) to f(0, m) in the first display processing module 109a. Moreover, the compressor/extender 108c compresses a predetermined number of data among the detailed echo data f(0, 0) to f(0, m) based on the number of pixels of the short side 103c of the display screen 103a in the horizontally-long screen state. In this case, the number of the detailed echo data to be compressed corresponds to a difference between the maximum number of pixels of the long side 103b of the display screen 103a and the maximum number of pixels of the short side 103c of the display screen 103a.

For example, among the detailed echo data f(0, 0) to f(0, m), the compressor/extender 108c averages the detailed echo data f(0, 0) and f(0, 1) to be compressed echo data g'(0, 0) of a pixel corresponding to the shallowest position. Similarly, the compressor/extender 108c averages the detailed echo data f(0, 2) and f(0, 3) to be compressed echo data g'(0, 1) of a pixel corresponding to the second shallowest position. The compressor/extender 108c averages to compress a plurality of detailed echo data so as to generate echo data g'(0, 0) to g'(0, 1) of each pixel. The generated echo data serves as compressed echo data for one ping. The compression of the detailed echo data by the compressor/extender 108c is not limited to the example shown in FIG. 8, and may suitably be changed. For example, the compression of the detailed echo data may be applied as a single image compressing method.

On the other hand, the compressor/extender 108c also configures the extender in the claims, and extends the wide-area echo data in the depth direction, which is saved in the wide-area-display memory of the second display processing module 109b. In this case, the compressor/extender 108c extends the wide-area echo data to coincide with the signal component corresponding to the detailed echo data in the depth direction. Moreover, the compressor/extender 108c outputs the extended wide-area echo data (hereinafter, suitably referred to as "the extended echo data") to the detailed-display memory of the first display processing module 109a.

Figure 9:
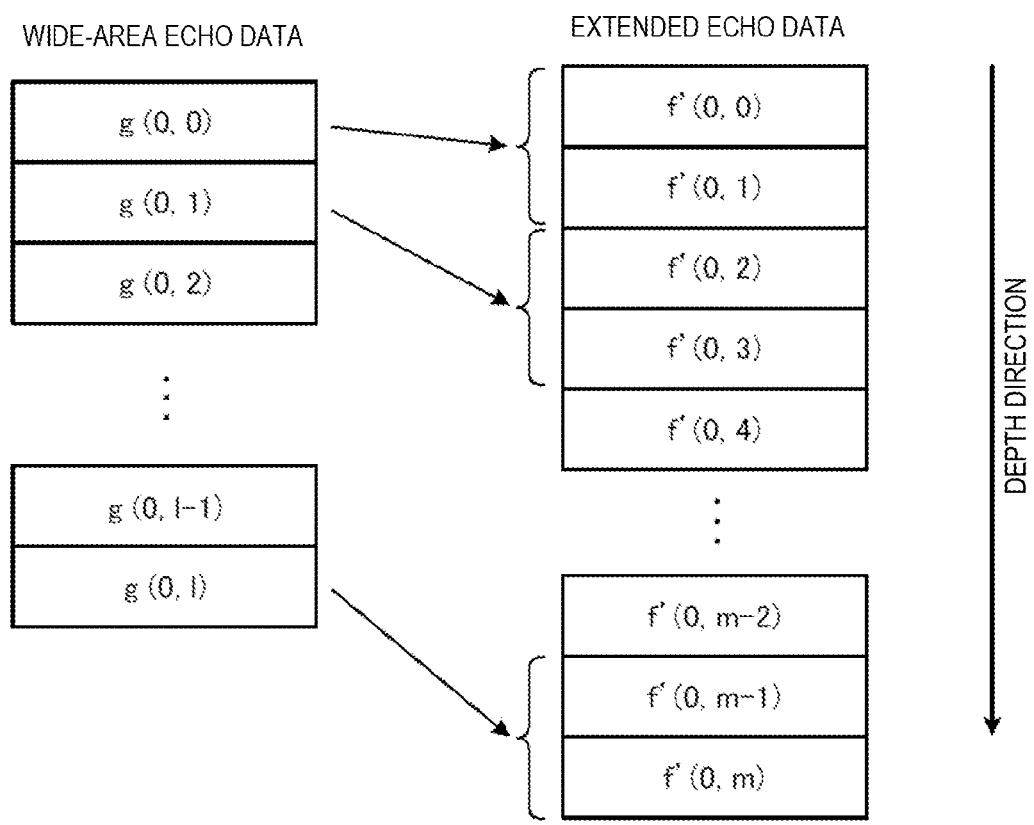
FIG. 9 is a schematic view of an example of an extending method of the wide-area-displaying echo data by the fish finder of the first embodiment.

Here, one example of a method of extending the wide-area echo data saved in the wide-area-display memory is described with reference to FIG. 9, which is a schematic view of the example of the extending method of the wide-area echo data by the fish finder 100 of the first embodiment. In FIG. 9, for the sake of convenience, the description is given using the wide-area echo data for one ping as an example. When the wide-area echo data for two or more pings is saved, the following extending method is repeated.

As shown in FIG. 9, when extending the wide-area echo data, the compressor/extender 108c reads the wide-area echo data g(0, 0) to g(0, 1) in the second display processing module 109b. Moreover, the compressor/extender 108c extends a predetermined number of data among the wide-area echo data g(0, 0) to g(0, 1) based on the number of pixels of the long side 103c of the display screen 103a in the vertically-long screen state. In this case, the number of the wide-area echo data to be extended corresponds to a difference between the maximum number of pixels of the long side 103b of the display screen 103a and the maximum number of pixels of the short side 103c of the display screen 103a.

For example, among the wide-area echo data g(0, 0) to g(0, 1), the compressor/extender 108c duplicates the wide-area echo data g(0, 0) to be extended echo data f'(0, 0) and f'(0, 1) of pixels corresponding to the shallowest and second shallowest positions. Similarly, the compressor/extender 108c duplicates the wide-area echo data g(0, 1) to be extended echo data f'(0, 2) and f'(0, 3) of pixels corresponding to the third and fourth shallowest positions. The compressor/extender 108c duplicates to extend a single piece of wide-area echo data so as to generate echo data f'(0, 0) to f'(0, m) of each pixel. The generated echo data as above serves as extended echo data for one ping. The extension of the wide-area echo data by the compressor/extender 108c is not limited to the example shown in FIG. 9, and may suitably be changed. For example, the extension of the wide-area echo data may be applied as a single image extending method.

The controller 101 receives signals between various components connected therewith and performs a control of the components. For example, the controller 101 accepts an instruction input from the operator via the user interface 102, to set the detection range. The controller 101 performs setting of a transmission cycle and a detection range of the transmission circuit 104, and setting of a cycle of sampling pulses of the A/D converter 106. The controller 101 performs an instruction on the memory 107 to generate write/read clocks and an address. Additionally, the controller 101 generates various processing signals on the signal processor 108 and the display processor 109 and performs an instruction on the signal processor 108 and the display processor 109 to perform calculation.

Particularly, the controller 101 detects the screen state (vertically-long screen state or horizontally-long screen state) of the display screen 103a due to the turning of the display unit 103. Moreover, the controller 101 changes a time range where the echo data is displayed on the display unit 103 based on the detected screen state. Similarly, the controller 101 changes a spatial range where the echo data is displayed on the display unit 103 based on the detected screen state. Specifically, the controller 101 instructs to generate and display the echo data to be displayed on the display unit 103 (e.g., detailed echo data and wide-area echo data) based on the detected screen state.

Figure 10:
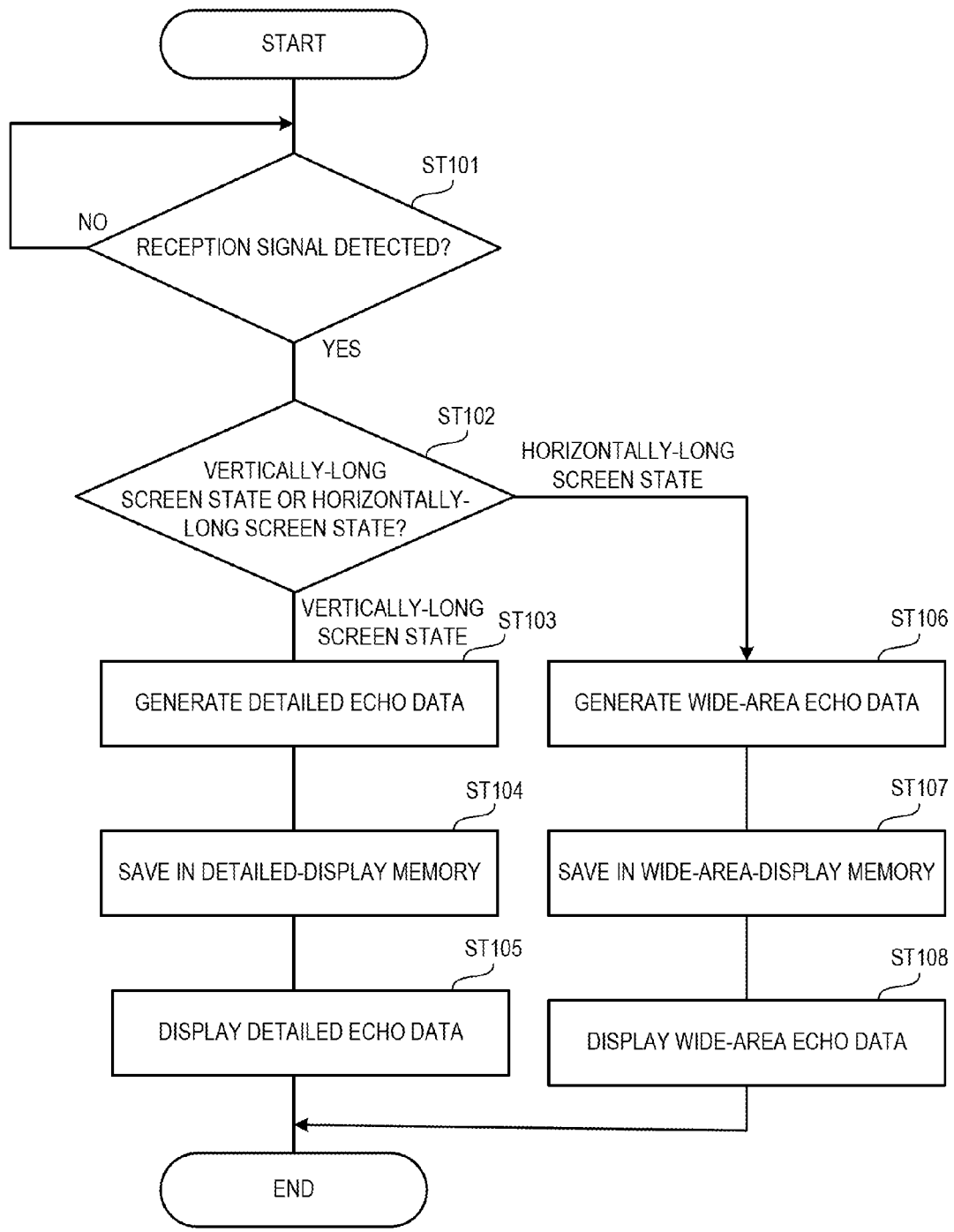
FIG. 10 is a flowchart for describing an operation of the fish finder of the first embodiment to display the details-displaying echo data and the wide-area displaying echo data.

Hereinafter, the displaying method of the echo data by the fish finder 100 is described. First, the operation of the fish finder 100 to display the detailed echo data and the wide-area echo data is described. FIG. 10 is a flowchart for describing the operation of the fish finder 100 of the first embodiment to display the detailed echo data and the wide-area echo data.

For example, when the operator instructs the fish finder 100 to display the echo data, a pulse-shaped signal is outputted from the transmission circuit 104 to the transducer 110. The transducer 110 outputs the ultrasonic wave underwater according to the pulse-shaped signal. Moreover, the ultrasonic wave reflected on the target object underwater is received by the transducer 110 as an echo. The transducer 110 outputs the reception signal corresponding to the intensity of the received echo to the reception circuit 105. After the ultrasonic wave is outputted, the controller 101 monitors whether the reception signal is detected by the transmission circuit 105 (ST101).

When the reception signal is detected, the controller 101 determines whether the display screen 103a of the display unit 103 is in the vertically-long screen state or the horizontally-long screen state (ST102). For example, the controller 101 determines the screen state of the display screen 103a based on a detection signal from an inclination sensor or an acceleration sensor for detecting an inclination of the display unit 103. For example, the controller 101 determines as the vertically-long screen state when the long side 103b of the display screen 103a is arranged at a position having over a predetermined inclination angle with respect to the horizontal direction. The controller 101 determines as the horizontally-long screen state when the short side 103c of the display screen 103a is arranged at a position having over a predetermined inclination angle with respect to the horizontal direction.

The determining method of the screen state of the display screen 103a is not limited to this, and may suitably be changed. For example, the determination may be performed based on a detection signal from a position sensor or an optical sensor for detecting a position of a part of the display unit 103. Note that, when the reception signal is not detected by the reception circuit 105, the controller 101 continues the monitoring operation at ST101.

The reception signal received by the reception circuit 105 is converted into the digital signal by the A/D converter 106 and is then stored in the memory 107 sequentially. For example, when the reception signal for one measurement (one ping) is stored in the memory 107, the controller 101 instructs the signal processor 108 to generate the detailed echo data or the wide-area echo data based on the determination result of the screen state at ST102.

When it is determined to be the vertically-long screen state at ST102, the controller 101 instructs the first echo data generating module 108a to generate the detailed echo data. Upon receiving this instruction, the first echo data generating module 108a reads the reception signal stored in the memory 107 and generates the detailed echo data corresponding to the maximum number of pixels (screen resolution) of the long side 103b of the display screen 103a (ST103, see FIG. 4). Then, the first echo data generating module 108a saves the generated detailed echo data in the detailed-display memory of the first display processing module 109a (ST104).

Next, the controller 101 instructs the first display processing module 109a to display the detailed echo on the display unit 103. Upon receiving this instruction, the first display processing module 109a outputs the saved detailed echo data on the display unit 103. Upon receiving the detailed echo data, the display unit 103 displays the detailed echo data on the display screen 103a (ST105). In this case, on the display screen 103a in the vertically-long screen state, a spatial display range of the echo data is formed relatively wide and the echo data can be displayed in detail in the depth direction. In this manner, the operator can check the position and state of the school of fish at a high resolution, for example. On the display screen 103a in the vertically-long screen state, the time display range of the echo data is formed relatively narrow.

On the other hand, when it is determined to be the horizontally-long screen state at ST102, the controller 101 instructs the second echo data generating module 108b to generate the wide-area echo data. Upon receiving this instruction, the second echo data generating module 108b reads the reception signal stored in the memory 107 and generates the wide-area echo data corresponding to the maximum number of pixels (screen resolution) of the short side 103b of the display screen 103a (ST106, see FIG. 6). Then, the second echo data generating module 108b saves the generated wide-area echo data in the wide-area-display memory of the second display processing module 109b (ST107).

Next, the controller 101 instructs the second display processing module 109b to display the wide-area echo on the display unit 103. Upon receiving this instruction, the second display processing module 109b outputs the saved wide-area echo data on the display unit 103. Upon receiving the wide-area echo data, the display unit 103 displays the wide-area echo data on the display screen 103a (ST108). In this case, on the display screen 103a in the horizontally-long screen state, the time display range of the echo data is formed relatively wide and the echo data can be displayed in a wide area in the time direction. In this manner, the operator can check the position and state of the school of fish at a high resolution, for example. On the display screen 103a in the horizontally-long screen state, the spatial display range of the echo data is formed relatively narrow.

As described above, the fish finder 100 of this embodiment changes the time or spatial display range of the echo data displayed on the display unit 103 based on the screen state of the display screen 103a due to the turning of the display unit 103. In this manner, the time or spatial display range of the echo data can be switched based on the screen state of the display screen 103a. As a result, the time or spatial display range of the echo data can be switched flexibly.

Specifically, with the fish finder 100 of this embodiment, the detailed echo data and the wide-area echo data are displayed on the display screen 103a while being switched based on the screen state of the display screen 103a due to the turning of the display unit 103. The long side 103b of the display screen 103a is associated with the depth direction, whereas, the short side 103c of the display screen 103a is associated with the time direction. As a result, the echo data can be displayed in detail in the depth direction, and the echo data can be displayed in a wide area in the time direction.

Particularly, with the fish finder 100 of this embodiment, the echo data (detailed echo data or the wide-area echo data) suitable for the detected screen state is generated based on the determination result of the state of the display screen 103a due to the turning of the display unit 103. Therefore, even in a peculiar display mode of the fish finder 100 such that the echo data is displayed on the display screen 103a while being updated with the time lapse by one line at a time in the vertical direction, the echo data can be displayed in detail in the depth direction while securing the visibility of the operator, as well as the echo data can be displayed in a wide area in the time direction.

With the fish finder 100 of this embodiment, the kind of the echo data displayed on the display screen 103a is switched based on whether the long side 103b of the display screen 103a is arranged in the up-and-down directions of the fish finder 100 or the short side 103c of the display screen 103a is arranged in the up-and-down directions of the fish finder 100. In this manner, based on the screen state of the display screen 103a, the echo data is surely displayed in detail in the depth direction and the echo data is displayed in a wide area in the time direction.

Additionally, with the fish finder 100 of this embodiment, the detailed echo data and the wide-area echo data generated from the reception signal are saved in the detailed-display memory and the wide-area-display memory, respectively. In this manner, the detailed echo data and the wide-area echo data can suitably be displayed based on the screen state of the display screen 103a without causing a situation of improper display, etc.

Figure 11:
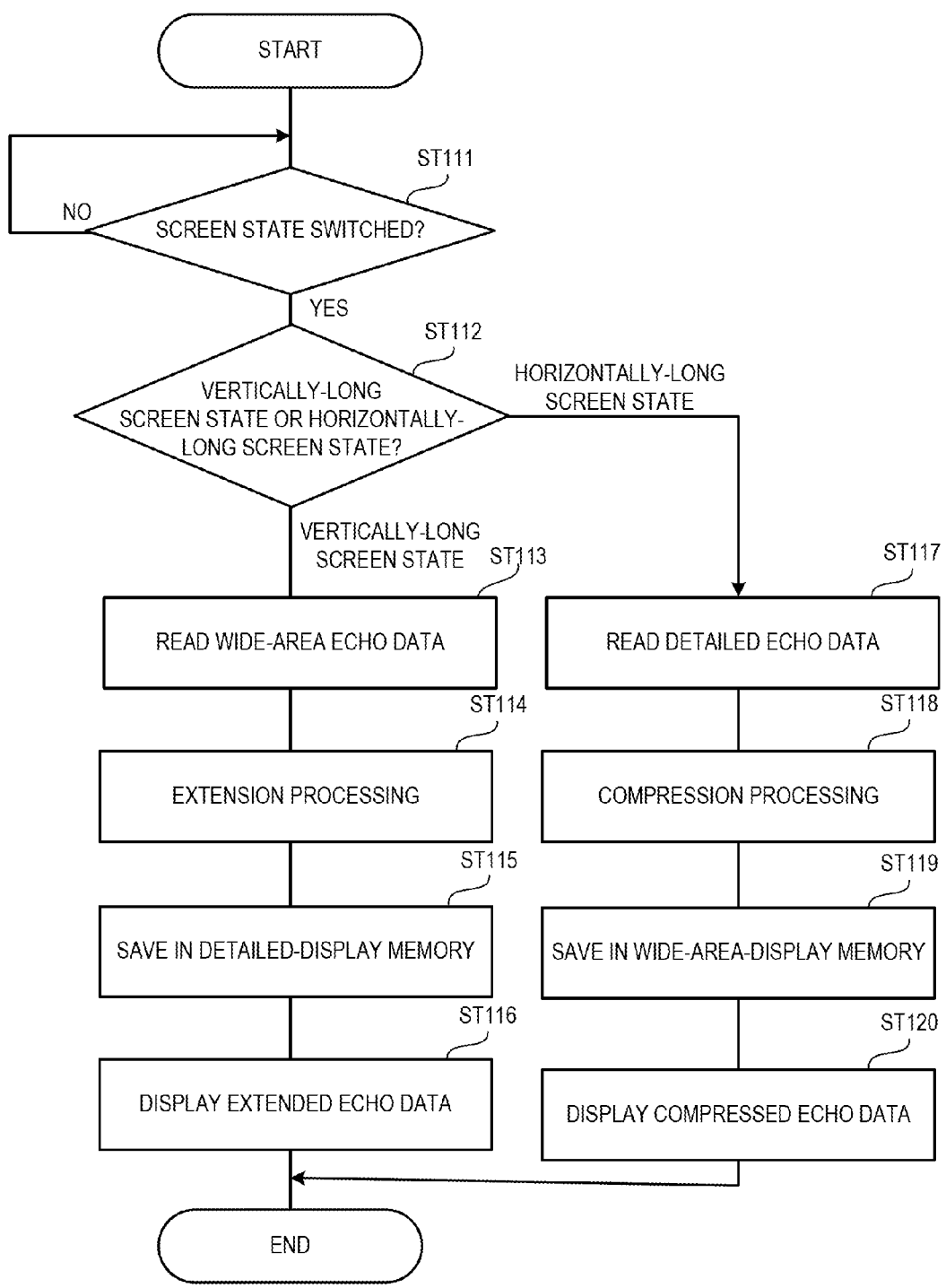
FIG. 11 is a flowchart for describing an operation of the fish finder of the first embodiment to display compressed echo data/extended echo data.

Next, the operation of the fish finder 100 of this embodiment to display the compressed echo data/extended echo data is described. FIG. 11 is a flowchart for describing the operation of the fish finder 100 of the first embodiment to display the compressed echo data/extended echo data.

When the detailed echo data or the wide-area echo data is displayed on the display screen 103a of the display unit 103, there are cases where the operator desires to change the screen display, such as, when the operator wants to check the echo data over a wide area in the time direction from the state where the detailed echo data is displayed or when the operator wants to check the echo data detailed in the depth direction from the state where the wide-area echo data is displayed.

In order to accept the operation for such cases, the controller 101 monitors whether the screen state of the display screen 103a of the display unit 103 is switched at all times after the fish finder 100 is activated (ST111). In other words, the controller 101 monitors whether the screen state of the display screen 103a is switched from the vertically-long screen state to the horizontally-long screen state, or from the horizontally-long screen state to the vertically-long screen state.

When it is detected that the screen state of the display screen 103 is switched, the controller 101 determines whether the screen state after the switching is the vertically-long screen state or the horizontally-long screen state (ST112). The detecting method of the screen state in such case is similar to ST102 shown in FIG. 10. Note that, when the switching of the screen state of the display screen 103 is not detected, the controller 101 continues the monitoring operation at ST111.

When the screen state after the switching is determined to be the vertically-long screen state at ST112, the controller 101 instructs the compressor/extender 108c to extend the wide-area echo data. Upon receiving this instruction, the compressor/extender 108c reads the wide-area echo data stored in the wide-area-display memory of the second display processing module 109b (ST113). The compressor/extender 108c extends the wide-area echo data (ST114, see FIG. 9). The compressor/extender 108c saves the extended wide-area echo data (extended echo data) in the detailed-display memory of the first display processing module 109a (ST115).

Next, the controller 101 instructs the first display processing module 109a to display the extended echo data on the display unit 103. Upon receiving this instruction, the first display processing module 109a outputs the saved extended echo data to the display unit 103. Upon receiving the extended echo data, the display unit 103 displays the extended echo data on the display screen 103a (ST116). In this case, the extended echo data using the wide-area echo data which is stored in the wide-area-display memory can be displayed on the display screen 103a in the vertically-long screen state. When the screen state of the display screen 103a is switched from the horizontally-long screen state to the vertically-long screen state, the extended echo data is displayed without waiting the detailed echo data to be displayed.

On the other hand, when the screen state after the switching is determined to be the horizontally-long screen state at ST112, the controller 101 instructs the compressor/extender 108c to compress the detailed echo data. Upon receiving this instruction, the compressor/extender 108c reads the detailed echo data stored in the detailed-display memory of the first display processing module 109a (ST117). Then the compressor/extender 108c compresses the detailed echo data (ST118, see FIG. 8). Further, the compressor/extender 108c saves the compressed detailed echo data (compressed echo data) in the wide-area-display memory of the second display processing module 109b (ST 119).

Next, the controller 101 instructs the second display processing module 109b to display the compressed echo data on the display unit 103. Upon receiving this instruction, the second display processing module 109b outputs the saved compressed echo data to the display unit 103. Upon receiving the compressed echo data, the display unit 103 displays the compressed echo data on the display screen 103a (ST120). In this case, the compressed echo data using the detailed echo data which is stored in the detailed-display memory can be displayed on the display screen 103a in the horizontally-long screen state. In this manner, when the screen state of the display screen 103a is switched from the vertically-long screen state to the horizontally-long screen state, the compressed echo data is displayed without waiting the wide-area echo data to be displayed.

As described above, with the fish finder 100 of this embodiment, the detailed echo data in the detailed-display memory is compressed by the compressor/extender 108c and is outputted to the wide-area-display memory. Therefore, the compressed echo data is displayed on the display screen 103a in the horizontally-long screen state. After the operator switches the screen state of the display screen 103a from the vertically-long screen state to the horizontally-long screen state, he/she can immediately check the position and state of the school of fish and the like with the compressed echo data. Similarly, the wide-area echo data in the wide-area-display memory is extended by the compressor/extender 108c and is outputted to the detailed-display memory. Therefore, the extended echo data is displayed on the display screen 103a in the vertically-long screen state. After the operator switches the screen state of the display screen 103a from the horizontally-long screen state to the vertically-long screen state, he/she can immediately check the position and state of the school of fish and the like with the extended wide-area echo data.

In the case where it is instructed to display the extended echo data according to FIG. 11, when the detailed echo data obtained earlier is remained in the detailed-display memory, the first display processing module 109a outputs combined echo data obtained by combining the remained detailed echo data and the extended echo data received from the compressor/extender 108c, to the display unit 103. When the display unit 103 receives the combined echo data, it displays the combined echo data on the display screen 103a. In other words, when the detailed echo data and the extended echo data are both saved in the detailed-display memory, the display unit 103 displays the combined echo data formed of the detailed echo data and the extended echo data.

Figure 12A:
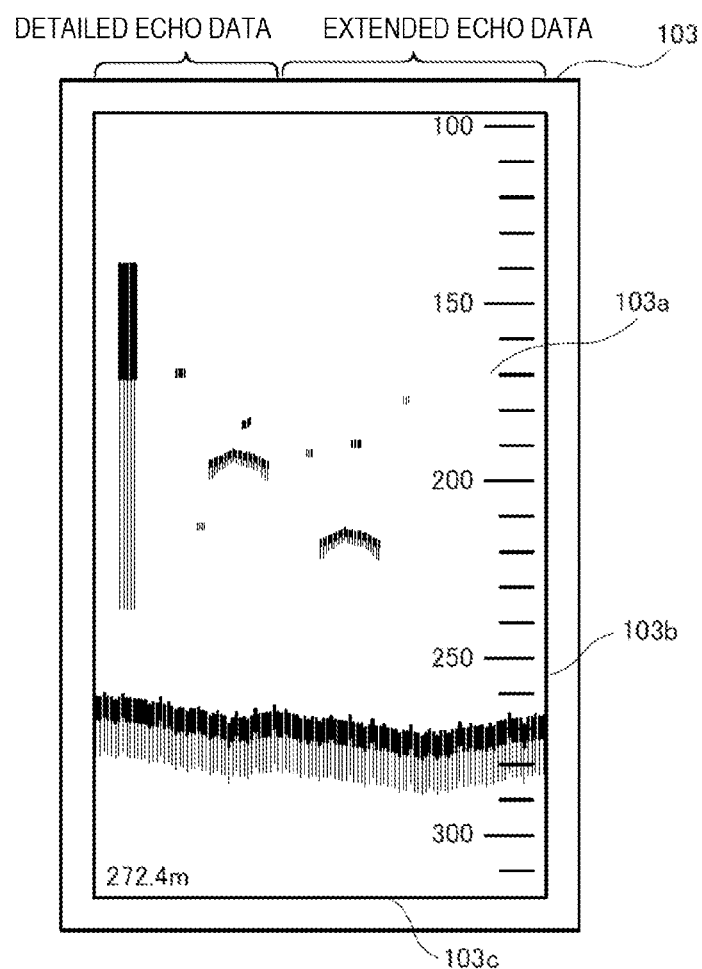
FIGS. 12A and 12B are schematic views of a display example on the display screen when combined data is displayed in the fish finder of the first embodiment.

In this case, the combined data formed of the detailed echo data and the extended echo data as shown in FIG. 12A is displayed on the display screen 103a of the display unit 103. As shown in FIG. 12A, on the display screen 103a, the detailed echo data is displayed in the left side section, and the extended echo data is displayed continuously from the detailed echo data. Thus, the echo data with a large information amount which includes the echo data saved as the wide-area echo data, and the detailed echo data, can be displayed on the display screen 103a in the vertically-long screen state.

Particularly, the extended echo data is extended to coincide with the signal component corresponding to the detailed echo data in the depth direction as described above. Therefore, the echo data saved in the wide-area-display memory as the wide-area echo data in the normal display mode of the display screen 103a in the vertically-long screen state. As a result, the operator can check the echo data without feeling any discomfort to the display screen 103a in the vertically-long screen state even when the wide-area echo data is used.

Similarly, in the case where it is instructed to display the compressed echo data according to FIG. 11, when the wide-area echo data obtained earlier is remained in the wide-area-display memory, the second display processing module 109b outputs combined echo data obtained by combining the remained wide-area echo data and the compressed echo data received from the compressor/extender 108c, to the display unit 103. When the display unit 103 receives the combined echo data, it displays the combined echo data on the display screen 103a. In other words, when the wide-area echo data and the compressed echo data are both saved in the wide-area-display memory, the display unit 103 displays the combined echo data formed of the wide-area echo data and the compressed echo data.

Figure 12B:
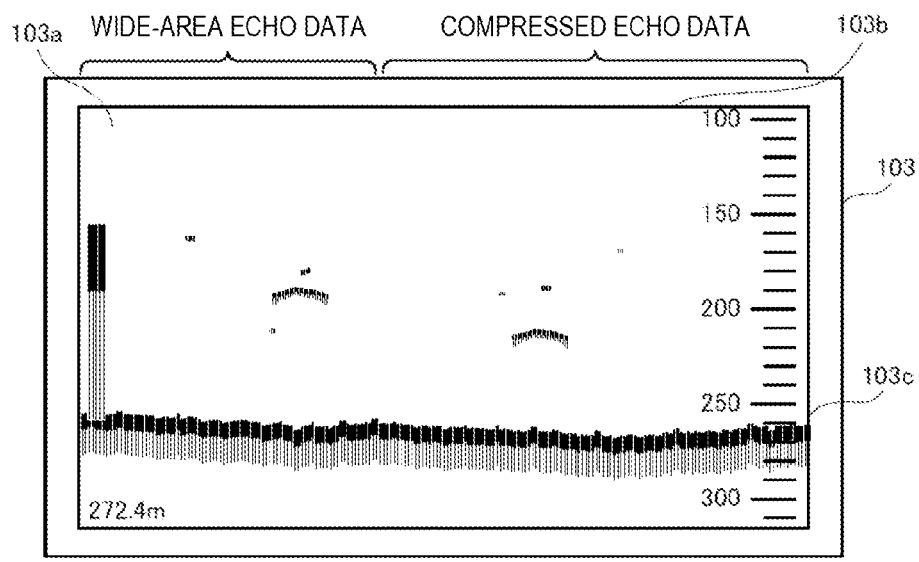

In this case, the combined data formed of the wide-area echo data and the compressed echo data as shown in FIG. 12B is displayed on the display screen 103a of the display unit 103. As shown in FIG. 12B, on the display screen 103a, the wide-area echo data is displayed in the left side section, and the compressed echo data is displayed continuously from the wide-area echo data. Thus, the echo data with a large information amount which includes the echo data saved as the detailed echo data, and the wide-area echo data, can be displayed on the display screen 103a in the horizontally-long screen state.

Particularly, the compressed echo data is compressed to coincide with the signal component corresponding to the wide-area echo data in the depth direction as described above. Therefore, the echo data saved in the detailed-display memory as the detailed echo data in the normal display mode of the display screen 103a in the horizontally-long screen state. As a result, the operator can check the echo data without feeling any discomfort to the display screen 103a in the horizontally-long screen state even when the detailed echo data is used.

With the combined echo data shown in FIG. 12A, the extended echo data is generated by extending the wide-area echo data. Therefore, the display accuracy of the extended echo data for the school of fish and the like degrades compared to the original display accuracy of the detailed echo data. Similarly, with the combined echo data shown in FIG. 12B, the compressed echo data is generated by compressing the detailed echo data. The display accuracy of the compressed echo data for the school of fish and the like degrades compared to the original display accuracy of the wide-area echo data. However, in FIGS. 12A and 12B, for the sake of convenience, the illustration is made without showing the difference in the display accuracy.

(Second Embodiment)

Figure 13:
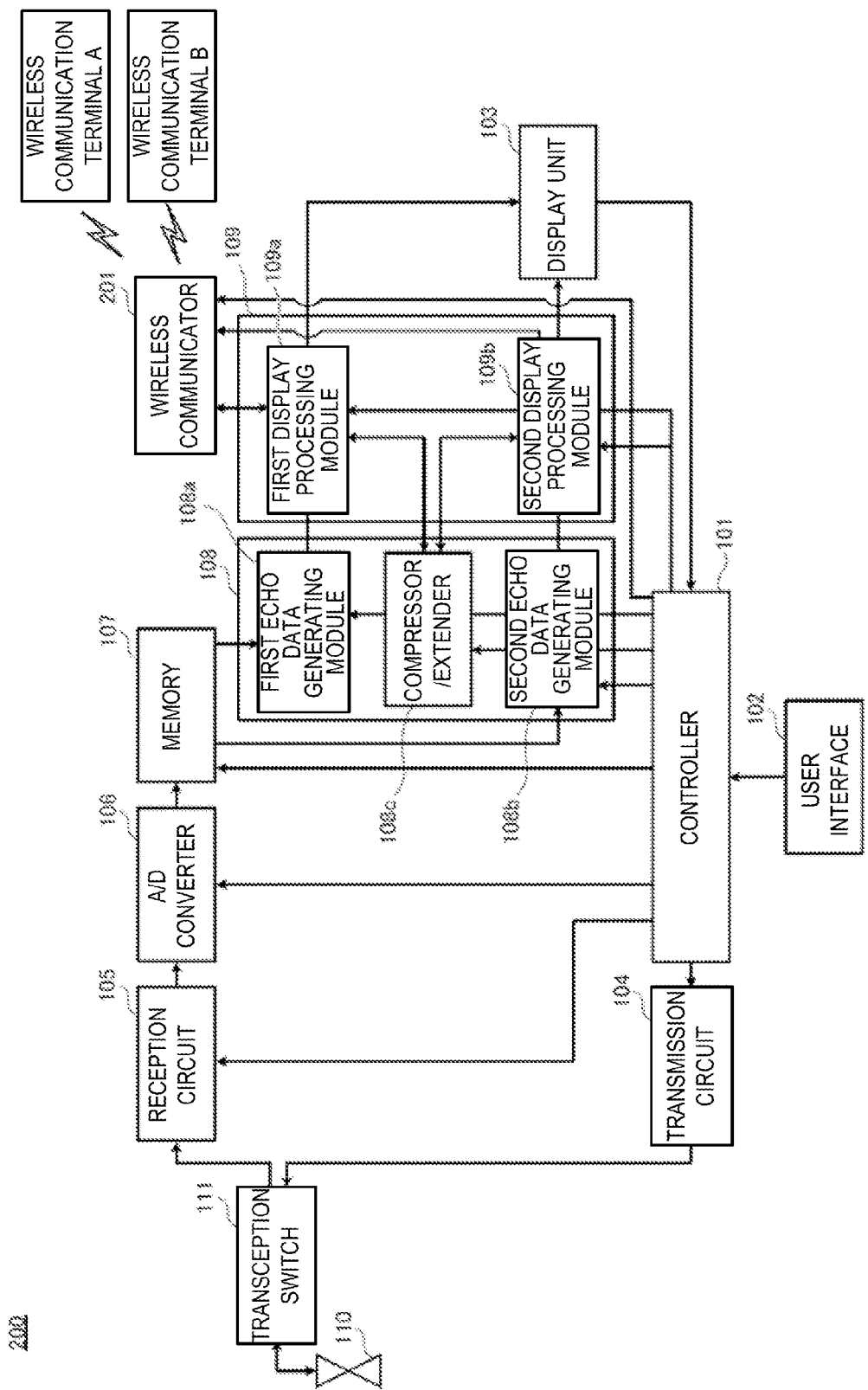
FIG. 13 is a block diagram showing a configuration of a fish finder according to a second embodiment of the present invention.

The fish finder 100 of the first embodiment displays the echo data (e.g., detailed echo data and wide-area echo data) on the display screen 103a of the display unit 103. Meanwhile, the fish finder of a second embodiment can display the echo data on a display device having a communication function. FIG. 13 is a block diagram showing a configuration of a fish finder 200 of the second embodiment. With the fish finder 200 shown in FIG. 13, the common components to FIG. 1 are noted with the same reference numerals and the description thereof is omitted.

As shown in FIG. 13, the fish finder 200 of the second embodiment is different from the fish finder 100 of the first embodiment in the point where it has, not only the components of the fish finder 100 of the first embodiment but also a wireless communicator 201 as a communicator. The wireless communicator 201 performs a wireless communication with wireless communication terminals located with a predetermined distance from the fish finder 200. Note that, in FIG. 13, two wireless communication terminals A and B are shown as the wireless communication terminals communicated with the wireless communicator 201. The number of wireless communication terminals serving as communication targets is not limited to two.

For example, the wireless communicator 201 has a wireless LAN communication function and can communicate with the wireless communication terminals having a wireless LAN communication function. The wireless communication technique used in the wireless communicator 201 is not limited to the wireless LAN communication technology, and may suitably be changed. For example, Bluetooth™ communication technology or IrDA (Infrared Data Association) communication technology using infrared can be used.

The wireless communicator 201 is communicated with the controller 101, and the first and second display processing modules 109a and 109b of the display processor 109. Under the control of the controller 101, the wireless communicator 201 transmits the echo data received from the first and second display processing modules 109a and 109b, to the wireless communication terminals A and B. Moreover, the wireless communicator 201 receives information including screen states of display screens from the wireless communication terminals A and B therefrom.

For example, the wireless communication terminals A and B are configured with a multi-function mobile phone and a personal computer (PC). The multi-function mobile phone includes a so-called smart phone. The PC includes a tablet PC. Each of the wireless communication terminals A and B is provided with a display screen having a long side where the resolution is relatively high and a short side where the resolution is relatively low. Each of the wireless communication terminals A and B has the wireless LAN communication function and receives the echo data from the wireless communicator 201. Moreover, the wireless communication terminals A and B display the received echo data on the respective display screens. The wireless communication terminals A and B transmit the information including the current screen states of the display screens to the wireless communicator 201. For example, the wireless communication terminals A and B transmit the information of whether the display screens are in the vertically-long screen state or the horizontally-long screen state to the wireless communicator 201.

Hereinafter, the operation of the fish finder 200 of the second embodiment to display the detailed echo data/wide-area echo data on the display screens of the wireless communication terminals A and B is described with reference to FIG. 10. In the case of displaying the detailed echo data/wide-area echo data on the display screens of the wireless communication terminals A and B, the controller 101 monitors the receptions of the information including the current screen states of the display screens (hereinafter, referred to as "the display screen information") of the wireless communication terminals A and B therefrom in parallel to the processing at ST101 shown in FIG. 10. Here, the reception signal is detected at ST101.

In the case of receiving the display screen information from the wireless communication terminals A and B, the controller 101 determines whether the screen states included in the display screen information are in the vertically-long screen state or the horizontally-long screen state similarly to ST102. Note that, the determination of this case is performed based on the contents of the display screen information from the wireless communication terminals A and B.

When the screen states of the wireless communication terminals A and B are determined to be the vertically-long screen state, with the fish finder 200, it is instructed to generate the detailed echo data similarly to ST103 and ST104. Moreover, the detailed echo data generated according to the instruction is saved in the detailed-display memory of the first processing module 109a.

Next, the controller 101 instructs the first display processing module 109a and the wireless communicator 201 to display the detailed echo data on the wireless communication terminals A and B. Upon receiving this instruction, the first display processing module 109a outputs the saved detailed echo data to the wireless communicator 201. The wireless communicator 201 outputs the detailed echo data to the wireless communication terminals A and B.

Upon receiving the detailed echo data, the wireless communication terminals A and B display the detailed echo data on the display screens. In this case, on the display screens in the vertically-long screen state, the echo data can be displayed in detail in the depth direction. In this manner, an operator of the wireless communication terminals A and B can check a position and a state of a school of fish and the like at a high resolution.

On the other hand, when the screen states of the wireless communication terminals A and B are determined to be the horizontally-long screen state, with the fish finder 200, it is instructed to generate the wide-area echo data similarly to ST106 and ST107. Moreover, the wide-area echo data generated according to this instruction is saved in the wide-area-display memory of the second processing module 109*b*.

Next, the controller 101 instructs the second display processing module 109*b* and the wireless communicator 201 to display the wide-area echo data on the wireless communication terminals A and B. Upon receiving this instruction, the second display processing module 109*b* outputs the saved wide-area echo data to the wireless communicator 201. The wireless communicator 201 outputs the wide-area echo data to the wireless communication terminals A and B.

Upon receiving the wide-area echo data, the wireless communication terminals A and B display the wide-area echo data on the display screens. In this case, on the display screens in the vertically-long screen state, the echo data can be displayed in a wide area in the time direction. The operators of the wireless communication terminals A and B can check a previous position and a previous state of the school of fish and the like at a high resolution.

Next, the operation of the fish finder 200 of the second embodiment to display the compressed echo data/extended echo data is described with reference to FIG. 11. Also in the case of displaying the compressed echo data/extended echo data, the controller 101 monitors the receptions of the display screen information including the current screen states of the display screens of the wireless communication terminals A and B therefrom similarly to the processing at ST111.

In the case of receiving the display screen information from the wireless communication terminals A and B, the controller 101 determines whether the screen states included in the display screen information are in the vertically-long screen state or the horizontally-long screen state similarly to ST112. The determination of this case is performed based on the contents of the display screen information from the wireless communication terminals A and B.

When the screen states of the wireless communication terminals A and B are determined to be the vertically-long screen state, with the fish finder 200, similar to ST113 to ST115, the wide-area echo data is read from the wide-area-displayed memory and the compressor/extender 108*c* performs the extension thereon, and then the wide-area echo data is saved in the detailed-display memory of the first processing module 109*a*.

Next, the controller 101 instructs the first display processing module 109*a* and the wireless communicator 201 to display the extended echo data on the wireless communication terminals A and B. Upon receiving this instruction, the first display processing module 109*a* outputs the saved extended echo data to the wireless communicator 201. The wireless communicator 201 outputs the extended echo data to the wireless communication terminals A and B.

Upon receiving the extended echo data, the wireless communication terminals A and B display the extended echo data on the display screens. In this case, on the display screens in the vertically-long screen state of the wireless communication terminals A and B, the extended echo data using the wide-area echo data stored in the wide-area-display memory of the second display processing module 109*b* can be displayed. When the screen states of the display screens are switched from the horizontally-long screen state to the vertically-long screen state, the extended echo data is displayed without waiting for the detailed echo data to be displayed. As a result, the operator of the wireless communication terminals A and B can check the position and the state of the school of fish and the like with the extended echo data immediately after the screen state of the display screen is switched from the vertically-long screen state to the horizontally-long screen state.

On the other hand, when the screen states of the wireless communication terminals A and B are determined to be the horizontally-long screen state, with the fish finder 200, similar to ST117 to ST119, the detailed echo data is read from the detailed-displayed memory and the compressor/extender 108*c* performs the compression thereon, and then the detailed echo data is saved in the wide-area-display memory of the second processing module 109*b*.

Next, the controller 101 instructs the second display processing module 109*b* and the wireless communicator 201 to display the compressed echo data on the wireless communication terminals A and B. Upon receiving this instruction, the second display processing module 109*b* outputs the saved compressed echo data to the wireless communicator 201. The wireless communicator 201 outputs the compressed echo data to the wireless communication terminals A and B.

Upon receiving the compressed echo data, the wireless communication terminals A and B display the compressed echo data on the display screens. In this case, on the display screens of the wireless communication terminals A and B in the horizontally-long screen state, the compressed echo data using the detailed echo data stored in the detailed-display memory of the first display processing module 109*a* can be displayed. Thus, when the screen states of the display screens are switched from the vertically-long screen state to the horizontally-long screen state, the compressed echo data is displayed without waiting for the wide-area echo data to be displayed. As a result, the operator of the wireless communication terminals A and B can check the previous position and the previous state of the school of fish and the like with the compressed echo data immediately after the screen state of the display screen is switched from the vertically-long screen state to the horizontally-long screen state.

With the fish finder 200 of this embodiment, the echo data (e.g., detailed echo data or wide-area echo data) corresponding to the display screen states of the wireless communication terminals A and B is generated and is transmitted to the wireless communication terminals A and B. Thus, the echo data equivalent to the data on the display unit 103 of the fish finder 200 can be displayed on the wireless communication terminals A and B which can communicate with the fish finder 200 wirelessly.

Here, the case is described, where the wireless communication terminals A and B informs the screen states of their display screens and the echo data (e.g., detailed echo data or wide-area echo data) corresponding to the screen state is received from the fish finder 200 and is displayed on the display screens; however, the display method of the echo data in the wireless communication terminals A and B is not limited to this, and may suitably be changed. For example, the wireless communication terminals A and B, upon receiving the echo data from the fish finder 200, may display on the display screens by using the received echo data without informing the screen states of the display screen. In this case, the echo data (e.g., detailed echo data or wide-area echo data) can suitably be switched to be displayed according to the screen states of the display screens.

The present invention is not limited to the above embodiments, and may be modified in various forms and be implemented. In the above embodiments, the sizes and shapes of the components are not limited to that illustrated in the accompanying drawings, and may suitably be changed within the scope that the effects of the present invention can be exerted. Additionally, the present invention may suitably be modified and implemented without deviating from the scope of the purpose of the present invention.

For example, in the above embodiments, the case is described, where the wide-area echo data as the second echo data is generated by using the second echo data generating module 108b of the signal processor 108 to thin out the predetermined amount of signal components from the reception signal; however, the second echo data generated by the second echo data generating module 108b is not limited to this, and may suitably be changed. For example, the echo data can be generated centering the signal component with a high echo intensity in the reception signal in the depth direction, centering the signal component at a depth pre-specified by the operator via the user interface 102, or such that the lowermost part of the display screen 103a corresponds to the sea bottom.

In the above embodiments, the case is described, where the first and second echo data generating modules 108a and 108b and the compressor/extender 108c of the signal processor 108a are provided; however, the configuration of the signal processor 108 is not limited to this, and may suitably be changed. For example, in the case of omitting the display of the compressed echo data and the extended echo data, the compressor/extender 108c is not necessarily provided to the signal processor 108.

In the first embodiment, the case where the display unit 103 is turnably provided to the fish finder 100 is described; however, the configuration of the display unit 103 is not limited to this, and may suitably be changed. For example, the display unit 103 may be configured independently from the fish finder 100 so that it communicates the information of the screen state of the display screen 103a and the like with the controller 101. The communication of the information of the screen state of the display screen 103a in this case can be performed according to the fish finder 200 of the second embodiment.

In the second embodiment, the present invention is described to be relating to the fish finder that can display predetermined echo data on the wireless communication terminals that can communicate wirelessly with the fish finder 200; however, for the second embodiment of the present invention may also be applied as an invention relating to a school-of-fish detecting system including the fish finder 200 and the wireless communication terminals that can perform a wireless communication.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A fish finder, comprising:
a signal processor configured to receive a reception signal generated based on an echo of an ultrasonic wave from a target object, and to generate echo data corresponding to a distance from a transmission source of the ultrasonic wave to the target object every time the ultrasonic wave is transmitted, the ultrasonic wave being transmitted underwater;
a display unit having a display screen with a first side and a second side having a length different from the first side, the display screen being turnable around an axis pointing in a direction perpendicular to a planar surface of the display screen, the display unit being configured to display a distance-time image on the display screen based on the echo data; and
a controller configured to set a wide or narrow display time range on the display screen according to a turning state of the display screen, and configured to sequentially output in real-time on the display screen the echo data corresponding to the ultrasonic wave, line-feeding the echo data along the display time range that is set according to the turning state of the display screen, wherein
the turning state of the display screen is either a horizontally-long screen state that sets the wide display time range on the display screen, or a vertically-long screen state that sets the narrow display time range on the display screen; and
the controller is further configured to line-feed echo data along the wide display time range of the horizontally-long screen state at a line-feed rate that is equal to a line-feed rate at which the controller is configured to line-feed echo data along the narrow display time range of the vertically-long screen state, so that echo data resulting from more ultrasonic wave transmissions is displayed at a given time along the wide display time range than echo data that is displayed along the narrow display time range at the given time.

2. The fish finder of claim 1, wherein the controller sets a higher resolution distance range or a lower resolution distance range on the display unit, according to the turning state of the display screen.

3. The fish finder of claim 1, wherein the first side of the display screen is longer than the second side and, according to the turning state of the display screen, the signal processor associates the first side of the display screen with distances included in a first echo data and the second side of the display screen with distances included in a second echo data, wherein
the first side has a higher resolution than the second side.

4. The fish finder of claim 3, wherein the controller detects a first screen state where the first side of the display screen is arranged in a vertical direction, and a second screen state where the second side of the display screen is arranged in a vertical direction, and
wherein the signal processor generates the first echo data when the first screen state is detected, and generates the second echo data when the second screen state is detected.

5. The fish finder of claim 3, wherein the signal processor includes:
- a first echo data generating module configured to generate the first echo data by thinning out a predetermined amount of signal components from the reception signal; and
- a second echo data generating module configured to generate the second echo data by thinning out a larger amount of the signal components from the reception signal than the first echo data generating module.

6. The fish finder of claim 3, further comprising:
- a first memory configured to save the first echo data; and
- a second memory configured to save the second echo data,
- wherein the display unit displays either one of the first echo data saved in the first memory and the second echo data saved in the second memory.

7. The fish finder of claim 1, further comprising a transceiver configured to transmit the ultrasonic wave and receive the echo.

8. The fish finder of claim 6, wherein the signal processor includes:
- an extender configured to extend the second echo data in the second memory and output the extended second echo data to the first memory when a first screen state is detected; and
- a compressor configured to compress the first echo data in the first memory and output the compressed first echo data to the second memory when a second screen state is detected.

9. The fish finder of claim 8, wherein
when the first echo data and the extended second echo data are saved in the first memory, the display unit is configured to display combined echo data obtained by combining the first echo data and extended second echo data.

10. The fish finder of claim 8, wherein
when the second echo data and the compressed first echo data are saved in the second memory, the display unit is configured to display combined echo data obtained by combining the second echo data and compressed first echo data.

11. The fish finder of claim 3, further comprising:
- a communicator configured to communicate with a wireless communication terminal having a display screen for displaying the echo data, wherein
when the controller is informed of a screen state of the display screen of the wireless communication terminal, the controller is configured to transmit either one of the first and second echo data to the wireless communication terminal via the communicator.

12. The fish finder of claim 9, wherein
the display unit is configured to display the combined echo data, such that a distance range of the first echo data matches a distance range of the extended second echo data.

13. The fish finder of claim 10, wherein
the display unit is configured to display the combined echo data, such that a distance range of the second echo data matches a distance range of the compressed first echo data.

* * * * *